United States Patent [19]

Lund

[11] Patent Number: 5,044,796
[45] Date of Patent: Sep. 3, 1991

[54] BIDIRECTIONAL PRINTING METHOD IN ACCORDANCE WITH VERTICAL BREAKS

[75] Inventor: Mark D. Lund, Vancouver, Wash.

[73] Assignee: Hewlett-Packard Company, Palo Alto, Calif.

[21] Appl. No.: 299,105

[22] Filed: Jan. 19, 1989

[51] Int. Cl.⁵ .......................... B41J 19/14; B41J 2/52
[52] U.S. Cl. ..................................... 400/323; 400/65; 400/121
[58] Field of Search ............. 400/65, 121, 323, 323.1; 364/518, 519

[56] References Cited

U.S. PATENT DOCUMENTS

| | | | |
|---|---|---|---|
| 4,553,867 | 11/1985 | Nakai | 400/323 |
| 4,655,622 | 4/1987 | Aoki | 400/121 |
| 4,707,153 | 11/1987 | Nishi | 400/121 |
| 4,740,092 | 4/1988 | Applegate | 400/121 X |
| 4,761,085 | 8/1988 | Angst | 400/121 |

FOREIGN PATENT DOCUMENTS

| | | | |
|---|---|---|---|
| 161177 | 8/1985 | Japan | 400/322 |
| 161178 | 8/1985 | Japan | 400/322 |

Primary Examiner—David A. Wiecking
Assistant Examiner—Steven S. Kelley

[57] ABSTRACT

The invented bidirectional graphics printing method includes software which first receives data describing at least part of an image to be printed, and then looks for breaks in the image. When a break is detected, bidirectional printing is allowed if such printing would increase throughput. If no break is detected, the next printhead pass is in the same direction as the previous pass.

11 Claims, 2 Drawing Sheets

BIDIRECTIONAL PRINTING METHOD IN ACCORDANCE WITH VERTICAL BREAKS

TECHNICAL FIELD

This invention relates to a method used to increase the speed of scanning head printers, and more particularly, to software which increases a scanning head printer's throughput by allowing selectively for bidirectional graphics printing.

BACKGROUND ART

Scanning head printers are printers wherein a printhead moves across a page one line at a time. For example, a printhead may scan from left to right or right to left across a page, printing as it advances.

A printhead is the part of a printer which causes an image to be imprinted on the page. Often, a printhead includes a vertical array of print elements which form dots on a page. Different images are printed by different print elements being fired at different times and in different locations. Each element is capable of printing one row of dots across the page.

If the vertical dimension of the image to be printed is less than the vertical height of the printhead, then the image can be printed in one printhead pass. An example of such an image includes 9- to 12-point text characters, when printed by a 1/6th-inch high printhead. However, images to be printed are often bigger than the printhead, especially when printing computer graphics. Accordingly, the printer may print part of the image in one pass of the printhead and the remaining part in subsequent passes.

When images are printed in more than one pass of the printhead, the problem of print misregistration may occur. Print misregistration is a misalignment of dots resulting in poor print quality. It is caused by printing two vertically adjacent dots in different passes of the printhead moving in opposite directions. Misregistration is caused by a backlash from the changed motion of the printhead.

By printing unidirectionally, print misregistration is avoided, but printer speed is limited. Accordingly, scanning head printers generally print small images such as text characters which are smaller than or equal to the height of the printhead bidirectionally, and larger text characters and graphics unidirectionally. Alternatively, to maintain print quality, all images may be printed unidirectionally.

In short, the throughput of a scanning head printer is generally decreased when large images or graphics are printed, because unidirectional printing is necessary to maintain print quality.

This invention increases the throughput of a scanning head printer by providing a step-control algorithm which, under proper circumstances, allows some graphic images to be printed bidirectionally.

DISCLOSURE OF THE INVENTION

The invented bidirectional graphics printing method includes software which first receives data describing at least part of an image to be printed, and then looks for vertical breaks in the image. If a break is detected, bidirectional printing is allowed. If no break is detected, the next printhead pass is in the same direction as the previous pass.

BEST MODE FOR CARRYING OUT THE INVENTION

Figure 1:
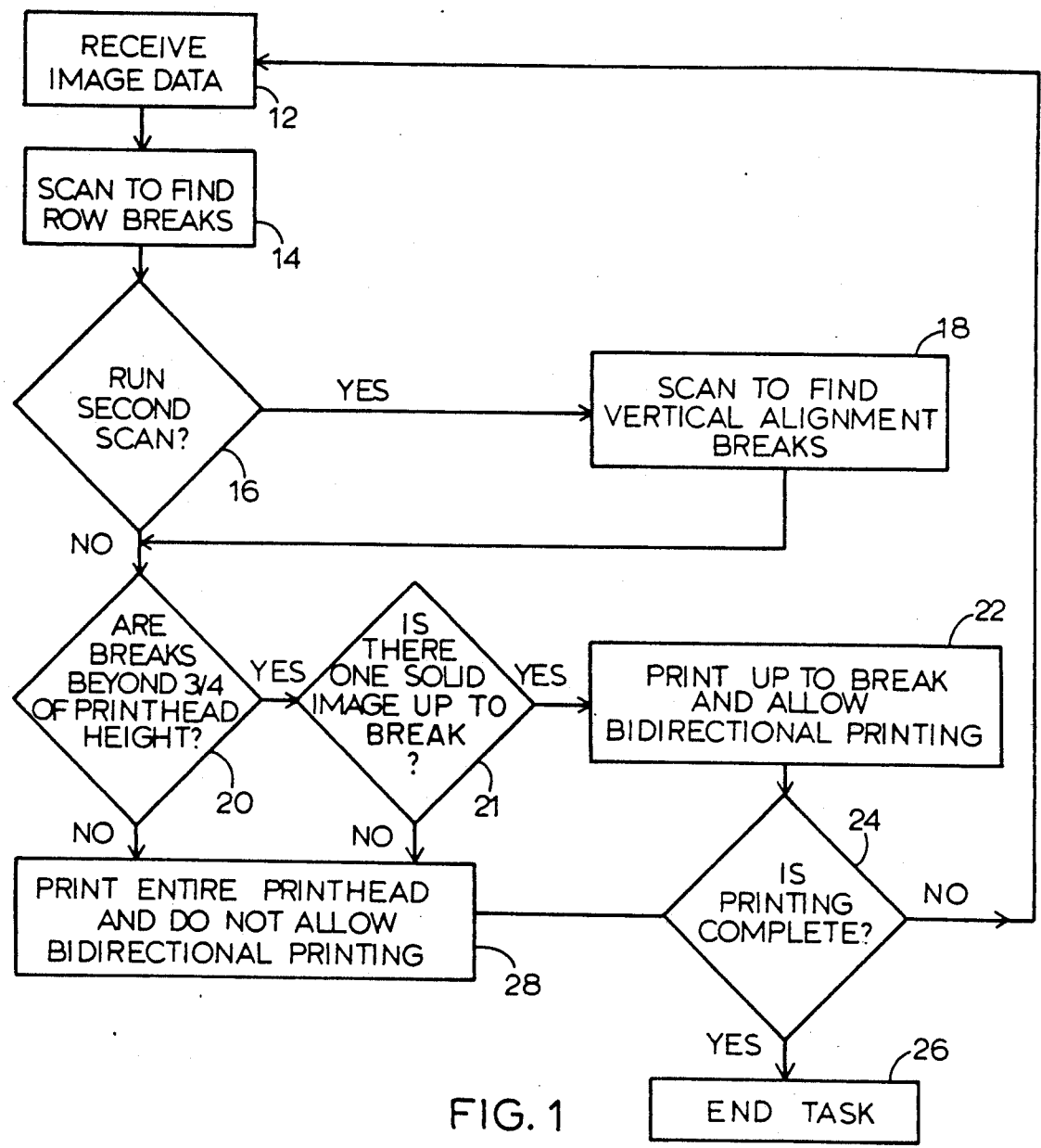
FIG. 1 is a block diagram outlining the invented method.

FIG. 1 shows generally at 10 a block diagram outlining the steps of the invented method. Initially, a printer receives data defining part of the image to be printed, such step being symbolized by block 12.

The received data may be any data conveyed on a graphics-bit-map format, including text. When a page of text is conveyed on such a format, the invented method may allow bidirectional printing and thereby increase printer throughput. Accordingly, the term "image" includes both graphics images and text characters.

Received data is then scanned to determine whether there are any breaks in the image. A break is a vertical separation of at least one blank dot row between elements of the image. For example, in a printhead with fifty print elements arranged vertically, each element is capable of printing one row of dots. If the image is such that one element is not required to print any dots in the row, then there is a break in the image. Block 14 signifies the step of finding such dot-row breaks.

If desired, the software can be programmed to perform a second scan of the data, the choice being shown by step 16, and the scan being shown by block 18. A second scan finds vertical alignment breaks in the image by determining whether two consecutive dot-rows of the image have any dots in near vertical alignment. In other words, for every dot in the first row, there must not be a dot directly under it, or at a 45-degree angle relative to it, in the next row. If that test is met, the software identifies a break between the rows. However, this second scan is time consuming and detects only a small number of breaks. Accordingly, the second scan may be deleted from the invented method or a user may choose not to run the second scan. Put another way, with "second-scan" action not to be employed, FIG. 1 can be re-viewed with blocks 16, 18 missing, and with process flow indicated by an arrow extending down from block 14 to the block (20) immediately below block 16.

In either case, the next step 20 is to determine whether time is minimized by printing a whole printhead height of data unidirectionally, or by printing less than a whole printhead height of data and then allowing bidirectional printing. Step 20 recognizes both dot-row breaks and, when applicable, vertical alignment breaks.

Experimentation has shown that time is minimized by printing a whole printhead height of data unidirectionally when there are no breaks in the image at or beyond $\frac{3}{4}$ of the printhead height. If a break appears beyond $\frac{3}{4}$ of the printhead height, time is minimized by printing the smaller band of data up to the break, and by then allowing the next printhead pass to be printed in either direction.

For example, in a printhead having a height of fifty nozzles, each nozzle capable of printing one row of dots, if nozzle thirty-seven (counting the nozzles from the top of the printhead down) is not required to print any dots, then a break appears in row thirty-seven. Time would be minimized by printing the image up to the break, and by then allowing for bidirectional printing.

In this example, row thirty-seven is the row at ¾ of the printhead height. Similarly, this analysis applies to any break detected in rows thirty-seven through fifty. Accordingly, step 20 determines where the breaks occur in relation to the printhead height.

Because the ¾ printhead height dimension was found to work well in certain applications, it is explained herein. However, the dimension is not mandatory and may be changed for other applications.

If a dashed-line is oriented vertically on a page, step 20 will recognize the breaks in the dashed-line beyond ¾ of the printhead height. In such a case, if bidirectional printing is allowed, the dashed-line may not be straight. Accordingly, step 21 determines whether there is more than one solid image within the printhead height up to the break detected at step 20.

A solid image is one without breaks. In a 50-print element printhead, if rows two through fifty all print, then there is one solid image. If there is a break at row thirty-eight, then rows two through thirty-seven constitute one solid image and rows thirty-nine through fifty constitute a second solid image The break at row thirty-eight, between the two solid images, is a solid image break.

If, as determined at step 21, two or more solid images appear within the printhead height up to the break detected at step 20, then the method proceeds to block 28. If only one solid image appears within the printhead height up to the break detected at step 20, then the method proceeds to block 22.

Step 21 is useful when text may be confused with vertical dashed lines. If desired, step 21 may be deleted from the invented method, and FIG. 1 viewed as proceeding directly from step 20 to either step 22 or 28.

If the software has detected dot-row or, if applicable, vertical alignment breaks at or beyond ¾ of the printhead height, and, if applicable, only one solid image appears within the printhead height, then the printer will print the portion of the image corresponding to the height of the printhead up to the detected dot-row or vertical alignment break, and will allow the next pass to be printed in either direction, as symbolized by box 22. In this case, the elements in the printhead below the break in the image will not print dots. If step 21 is deleted and several breaks exist beyond ¾ of the printhead height, only the image up to the first dot-row or vertical alignment break is printed.

Step 24 then determines whether the printing task is complete. If not, further data defining the image to be printed is collected, and the dot row immediately beneath the previously detected break now becomes the top row. The process then repeats until printing is complete, at which time the method ends as shown in step 26.

If no breaks appear at or beyond ¾ of the printhead height, or, if applicable, more than one solid image appears within the printhead height, the invented method prints a part of the image equal to the height of the entire printhead, and requires that the next pass be printed in the same direction, as illustrated by block 28.

The software next determines whether printing is complete, as shown in step 24. If not, the data defining the next part of the image is collected, and the process is repeated. If printing is complete, the task is ended as shown by box 26.

Figure 2A:
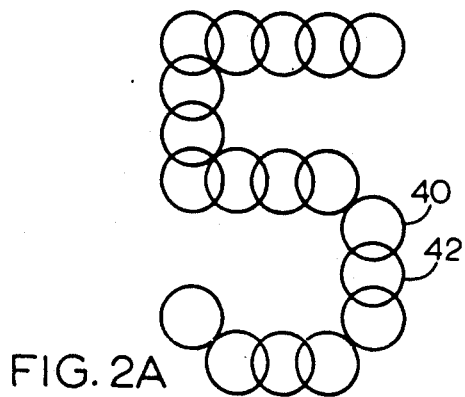
FIGS. 2A and 2B are enlarged images of the number "5" printed in two passes of a scanning printhead, FIG. 2A showing the alignment of dots when both passes of the printhead are in the same direction, and FIG. 2B showing vertical misalignment caused by bidirectional printing.
Figure 2B:
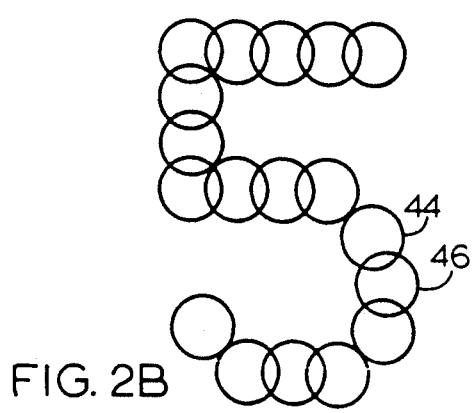

FIGS. 2A and 2B, by comparison, illustrate possible dot misalignment caused by bidirectional printing. Specifically, FIG. 2A is an enlarged view of the number "5" printed by a scanning head printer in two unidirectional passes of a printhead. FIG. 2A shows the proper alignment between dots 40, 42.

FIG. 2B shows the same image printed bidirectionally, or in passes of the printhead moving in different directions. The vertical offset between dots 44, 46, which correspond, in relative positions, to dots 40, 42, respectively in FIG. 2A, illustrates the misalignment problems connected with printing large characters and graphics images bidirectionally. Such misalignment, when noticeable, results in poor print quality. Noticeable misalignment is an offset between dots which does not result in the desired, predetermined quality of output.

Figure 3A:
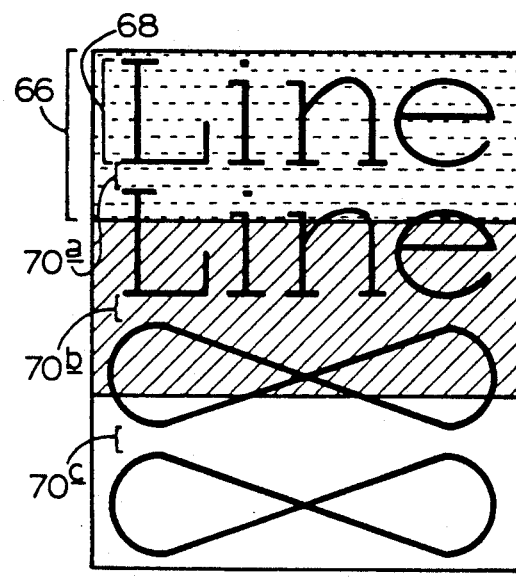
FIGS. 3A-D depict examples of how graphics images could be printed with a scanning head printer, FIGS. 3A and 3C illustrating conventional unidirectional printing, and FIGS. 3B and 3D illustrating accurate bidirectional printing made possible by the method of the present invention.
Figure 3B:
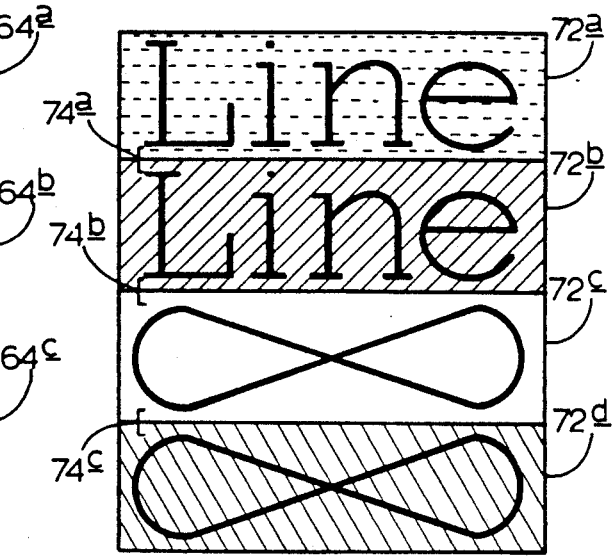

FIGS. 3A and 3B depict how graphic images could be printed with a scanning head printer. In FIG. 3A, rectangles 64a–c depict different passes of a printhead, all printed unidirectionally from left to right. The height of the printhead corresponds to the height of the rectangles, and is shown at 66. It is evident that the height 68 of each image to be printed is less than printhead height 66. Additionally, vertical breaks in the image are shown at 70a–c.

FIG. 3B shows the same image printed according to the invented method. Rectangles 72a–d illustrate different passes of the printhead. The difference between FIG. 3A and FIG. 3B is that FIG. 3B was printed bidirectionally. Rectangle 72a was printed left to right, then rectangle 72b was printed right to left, and so on. The invented method detected breaks 74a–c in the image, printed less than a full printhead height of the image, and allowed bidirectional printing.

Figure 3C:
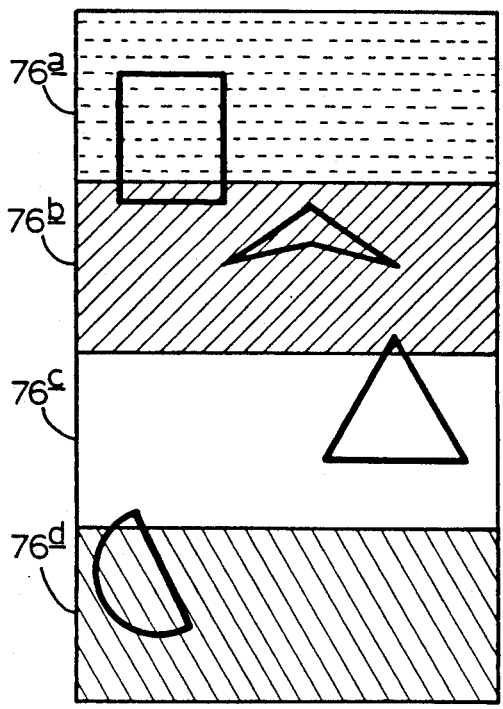

FIG. 3C depicts graphics images printed in four unidirectional passes of a printhead. Rectangles 76a–d represent such passes. Again, the height of the printhead corresponds to the height of the rectangles and is shown at 78.

Figure 3D:
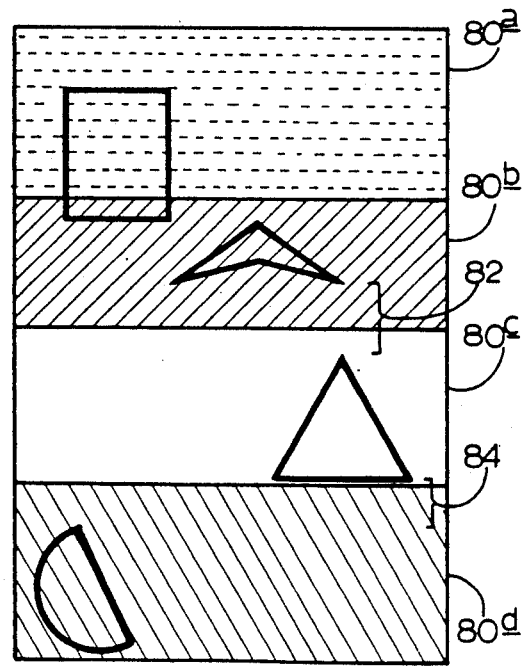

FIG. 3D shows the same images as in FIG. 3C printed according to the invented method. Rectangles 80a–d illustrate different passes of the printhead. Rectangle 80a was printed left to right, no break was detected beyond ¾ of the printhead height, and therefore rectangle 80b was also printed left to right.

When the data defining the image contained in rectangle 80b was scanned, break 82 was found. Accordingly, only the portion of the image corresponding to the height of the printhead up to the detected break was printed, resulting in rectangle 80b having a smaller vertical dimension than rectangle 80a.

Because of break 82, bidirectional printing was allowed, and rectangle 80c was printed right to left. In scanning the data defining the image within rectangle 80c, break 84 was detected. Accordingly, rectangle 80c printed only the part of the image up to break 84. Bidirectional printing was allowed because of the break, and rectangle 80d was printed left to right.

A simple model of the time ("T") required to print FIGS. 3A–D is calculated as follows, assuming that the non-printing slew speed of the printhead is twice as fast as the printing speed:

FIG. 3A: (3 passes at time T)+(3 printhead returns at time 0.5 T)=4.5 T

FIG. 3B: (4 passes at time T)=4 T

FIG. 3C: (4 passes at time T)+(4 printhead returns at time 0.5 T)=6 T

FIG. 3D: (4 passes at time T)+(1 printhead return at time 0.5 T)=4.5 T

As shown, the invented bidirectional graphics printing method printed faster without any degradation in print quality.

INDUSTRIAL APPLICABILITY

The invented bidirectional graphics printing method is applicable to any scanning head printer. Its application increases the throughput of such a printer by allowing graphics to be printed bidirectionally when doing so would not degrade print quality.

While the best mode or preferred embodiment of the invention has been described herein, variations and changes may be made without departing from the spirit of the invention.

What is claimed is:

1. A method for increasing the throughput of a scanning-head printer comprising:
   receiving data defining an image to be printed;
   analyzing such received data to determine when bidirectional printing could cause print misregistration between vertically adjacent parts of the image, said analyzing including detecting dot-row or vertical alignment breaks; and
   printing passes of the image bidirectionally when there are such breaks and unidirectionally when no such breaks are detected.

2. A method for increasing the throughout of a scanning-head printer comprising:
   receiving data defining an image to be printed;
   analyzing such received data to determine when bidirectional printing could cause print misregistration between vertically adjacent parts of the image, said analyzing including detecting solid image breaks within each printhead pass of the image; and
   printing passes of the image bidirectionally when print misregistration would not occur and unidirectionally when such misregistration could occur.

3. The method of claim 2, wherein the step of printing includes printing passes of the image which immediately follow the passes in which only one such break is detected bidirectionally, and printing other passes of the image unidirectionally.

4. The method of claim 2, wherein the step of analyzing further includes detecting dot-row breaks between vertically adjacent parts of the image.

5. The method of claim 4, wherein the step of printing further includes printing the passes of the image which immediately follow the passes in which such dot-row breaks are detected, and only one such solid image break is detected, bidirectionally, and printing other passes of the image unidirectionally.

6. A method, utilizing a scanning-head printer having a printhead with a vertical array of print elements wherein each element is capable of printing a row of dots, for increasing the printer's throughput comprising:
   receiving data defining at least part of an image to be printed;
   analyzing such received data to detect any dot-row breaks;
   determining the location of such dot-row breaks in relation to the printhead height;
   detecting solid image breaks within each printhead pass of the image;
   printing the entire print pass and requiring the next print pass to be printed in the same direction as the previous print pass if no such dot-row breaks occur in the dot rows at or beyond ¾ of the printhead height or if more than two solid image breaks are detected within the printhead height; and
   If a dot-row break occurs at or beyond ¾ of the printhead height and no more than two solid image breaks are detected within the printhead height, then printing the dot rows up to the dot-row break and allowing the next print pass to be printed the opposite direction.

7. A method, utilizing a scanning-head printer having a printhead with a vertical array of print elements wherein each element is capable of printing a row of dots, for increasing the printer's throughput comprising:
   receiving data defining at least part of an image to be printed;
   analyzing such received data to detect any dot-row breaks;
   determining the location of such dot-row breaks in relation to the printhead height;
   printing the entire print pass and requiring the next print pass to be printed in the same direction as the previous print pass if no such dot-row breaks occur in the dot rows at or beyond ¾ of the print head height; and
   if a dot-row break occurs at or beyond ¾ of the printhead height, then printing the dot rows up to the dot-row break and allowing the next print pass to be printed in the opposite direction.

8. A method for increasing the throughput of a scanning-head printer comprising:
   receiving data defining at least part of an image to be printed;
   analyzing the data to detect dow-row breaks; and
   allowing passes of the image to be printed bidirectionally when dot-row breaks are detected.

9. A method for increasing the throughput of a scanning-head printer comprising:
   receiving data defining at least part of an image to be printed;
   analyzing the data to detect vertical alignment breaks; and
   allowing passes of the image to be printed bidirectionally when vertical alignment breaks are detected.

10. A method for increasing the throughput of a scanning-head printer comprising:
    receiving data defining at least part of an image to be printed;
    analyzing the data to detect dot-row and vertical alignment breaks; and
    allowing passes of the image to be printed bidirectionally when either type of break is detected.

11. For use by a scanning-head printer having a printhead with a vertical array of print elements wherein each element is capable of printing a row of dots, a method for increasing the printer's throughput comprising:
    receiving data defining at least part of an image to be printed;

analyzing the data to detect dot-row breaks;
determining the location of the dot-row breaks in relation to the printhead height;
analyzing the data to detect solid images within the received data; and
allowing passes of the image to be printed bidirectionally when a dot-row break is detected at or beyond $\frac{3}{4}$ of the printhead height and there is only one solid image above the dot-row break.

* * * * *